(12) United States Patent
O'Ryan

(10) Patent No.: US 11,268,704 B2
(45) Date of Patent: Mar. 8, 2022

(54) OVEN HAVING A DIELECTRICALLY COATED GLASS SUBSTRATE THAT ABSORBS ELECTROMAGNETIC RADIATION AND EMITS HEAT RADIATION INTO THE OVEN CAVITY

(71) Applicant: SCHOTT GEMTRON CORP., Sweetwater, TN (US)

(72) Inventor: Adam O'Ryan, Sweetwater, TN (US)

(73) Assignee: SCHOTT AG, Mainz (DE)

( * ) Notice: Subject to any disclaimer, the term of this patent is extended or adjusted under 35 U.S.C. 154(b) by 365 days.

(21) Appl. No.: 16/324,500

(22) PCT Filed: Aug. 3, 2017

(86) PCT No.: PCT/US2017/045302
§ 371 (c)(1),
(2) Date: Feb. 8, 2019

(87) PCT Pub. No.: WO2018/027034
PCT Pub. Date: Feb. 8, 2018

(65) Prior Publication Data
US 2019/0186754 A1    Jun. 20, 2019

Related U.S. Application Data

(60) Provisional application No. 62/370,443, filed on Aug. 3, 2016.

(51) Int. Cl.
*F24C 15/00* (2006.01)
*H05B 6/64* (2006.01)
(Continued)

(52) U.S. Cl.
CPC .............. *F24C 15/005* (2013.01); *A21B 1/22* (2013.01); *A21B 3/00* (2013.01); *C03C 17/245* (2013.01);
(Continued)

(58) Field of Classification Search
CPC ........... A21B 1/22; A21B 3/00; C03C 17/245; C03C 17/2453; C03C 17/2456;
(Continued)

(56) References Cited

U.S. PATENT DOCUMENTS 3,701,872 A    10/1972    Levinson
3,853,612 A    12/1974    Spanoudis
(Continued)

FOREIGN PATENT DOCUMENTS

CN    100529549    8/2009
CN    101568206    10/2009
(Continued)

OTHER PUBLICATIONS

International Search Report and Written Opinion for corresponding PCT/US17/45302 dated Oct. 20, 2017, 10 pages.
(Continued)

*Primary Examiner* — Quang T Van
(74) *Attorney, Agent, or Firm* — Ohlandt, Greeley, Ruggiero & Perle, L.L.P.

(57) ABSTRACT

The present disclosure relates to an oven cavity having a dielectrically coated glass or glass-ceramic substrate that absorbs electromagnetic radiation thereby increasing the temperature of the substrate and the dielectric coating composition, and emits heat radiation into the oven cavity.

13 Claims, 5 Drawing Sheets

(51) Int. Cl.
| | |
|---|---|
| *H05B 6/46* | (2006.01) |
| *C09D 1/00* | (2006.01) |
| *C03C 17/245* | (2006.01) |
| *C09D 5/32* | (2006.01) |
| *A21B 3/00* | (2006.01) |
| *C03C 17/34* | (2006.01) |
| *A21B 1/22* | (2006.01) |

(52) U.S. Cl.
CPC ...... *C03C 17/2453* (2013.01); *C03C 17/2456* (2013.01); *C03C 17/3417* (2013.01); *C09D 1/00* (2013.01); *C09D 5/32* (2013.01); *H05B 6/46* (2013.01); *H05B 6/64* (2013.01); *C03C 2217/211* (2013.01); *C03C 2217/212* (2013.01); *C03C 2217/213* (2013.01); *C03C 2217/219* (2013.01); *C03C 2217/22* (2013.01); *C03C 2217/24* (2013.01); *C03C 2217/241* (2013.01); *C03C 2218/112* (2013.01); *C03C 2218/152* (2013.01)

(58) Field of Classification Search
CPC .......... C03C 17/3417; C03C 2217/211; C03C 2217/212; C03C 2217/213; C03C 2217/219; C03C 2217/22; C03C 2217/24; C03C 2217/241; C03C 2218/112; C03C 2218/152; C09D 1/00; C09D 5/32; F24C 15/005; H05B 6/46; H05B 6/64
USPC ....... 219/756, 739, 740, 769, 770, 759, 685, 219/751; 428/34.4, 76, 212, 341, 446, 428/450, 452; 427/575, 160; 118/723 MW; 220/573
See application file for complete search history.

(56) References Cited

U.S. PATENT DOCUMENTS

| | | | |
|---|---|---|---|
| 4,398,077 | A | 8/1983 | Freedman |
| 4,977,302 | A | 12/1990 | Merigaud |
| 5,240,886 | A | 8/1993 | Gulotta |
| 5,350,927 | A | 9/1994 | Rakhimov |
| 5,385,872 | A | 1/1995 | Gulotta |
| 5,393,593 | A | 2/1995 | Gulotta |
| 6,024,084 | A | 2/2000 | Gerhardinger |
| 6,436,541 | B1 | 8/2002 | Sopko |
| 6,596,398 | B1 | 7/2003 | Russo |
| 6,797,388 | B1 | 9/2004 | Szanyi |
| 6,822,208 | B2 | 11/2004 | Henze |
| 7,556,868 | B2 | 7/2009 | Thiel |
| 8,573,194 | B2 | 11/2013 | Henn |
| 8,772,687 | B2 | 7/2014 | Boxman |
| 2006/0138127 | A1 | 6/2006 | Kawashima |
| 2006/0165620 | A1* | 7/2006 | Bujard ................. C09C 1/0054 424/63 |
| 2006/0188730 | A1 | 8/2006 | Varanasi |
| 2007/0077411 | A1 | 4/2007 | Hatta |
| 2009/0197097 | A1* | 8/2009 | Medwick ................ B32B 27/36 428/432 |
| 2010/0155043 | A1 | 6/2010 | Smith |
| 2012/0058647 | A1 | 3/2012 | Oh |
| 2014/0004323 | A1 | 1/2014 | Bockmeyer |
| 2014/0220272 | A1 | 8/2014 | Lee |
| 2015/0168618 | A1 | 6/2015 | Nakajima |
| 2015/0316328 | A1* | 11/2015 | Trainham ................ F28D 19/02 165/10 |
| 2016/0195651 | A1 | 7/2016 | Yoshioka |
| 2017/0245680 | A1 | 8/2017 | Kim |

FOREIGN PATENT DOCUMENTS

| | | |
|---|---|---|
| CN | 201668310 | 12/2010 |
| CN | 102153959 | 8/2011 |
| CN | 103398402 | 11/2013 |
| CN | 203861052 | 10/2014 |
| CN | 204141996 | 2/2015 |
| CN | 104812115 | 7/2015 |
| DE | 4422439 | 1/1996 |
| EP | 0968143 | 7/2003 |
| JP | H02232011 | 9/1990 |
| JP | H04278123 | 10/1992 |
| JP | H0668975 | 3/1994 |
| JP | H0948640 | 2/1997 |
| JP | H0948641 | 2/1997 |
| JP | 2000081214 | 3/2000 |
| JP | 2005075697 | 3/2005 |
| JP | 2006286373 | 10/2006 |
| KR | 20110006895 | 1/2011 |
| WO | 2007046085 | 4/2007 |
| WO | 2015185214 | 12/2015 |
| WO | 2016144312 | 9/2016 |
| WO | 2018027034 | 2/2018 |
| WO | 2018031019 | 2/2018 |

OTHER PUBLICATIONS

International Preliminary Report on Patentability for corresponding PCT/US17/45302 dated Aug. 28, 2018, 10 pages.
Yang, "Silicon carbide powders: Temperature-dependent dielectric properties and enhanced microwave absorption at gigahertz range", ELSEVIER, Solid State Communications, vol. 163, pp1-6.
Sakka, "Chemical bonding and adherence in Sol-Gel Processing", Journal of the Japan Institute of Electronics Packaging, JP, The Japan Institute of Electronics Packaging, Nov. 1, 2002, vol. 5, No. 7, English translation of pp. 712 to 717.

* cited by examiner

OVEN HAVING A DIELECTRICALLY COATED GLASS SUBSTRATE THAT ABSORBS ELECTROMAGNETIC RADIATION AND EMITS HEAT RADIATION INTO THE OVEN CAVITY

CROSS-REFERENCE TO RELATED APPLICATION

The present application is a national stage application of International Application No. PCT/US2017/045302, filed on Aug. 3, 2017, which in turn claims priority to U.S. Provisional Ser. No. 62/370,443, filed on Aug. 3, 2016, each of which is incorporated herein by reference.

BACKGROUND OF THE DISCLOSURE

1. Field of the Disclosure

The present disclosure relates to an oven having a dielectrically coated glass or glass-ceramic substrate that absorbs electromagnetic radiation and emits heat radiation into the oven cavity.

2. Description of the Related Art

Residential electrically heated ovens and microwave ovens do not create a homogenous temperature within the oven cavity. The temperature within an electrically heated oven often increases slowly and varies depending on the distance from the heat source. Microwaves do not pass through every space within the oven cavity and hot and cold nodes are created. To improve temperature homogeneity, a rotating platform is used to move the contents within the oven cavity or a wave stirrer is used to disperse the microwaves, but microwave ovens rarely attain the necessary temperatures to produce Maillard reactions (caramelization in foods for example) and additional heat sources are usually required to reach the temperatures of electrically heated ovens.

Coating compositions have been applied to glass substrates, such as electrically heated oven doors and windows, to reflect heat and improve temperature uniformity within the cavity. However, many coated substrates do not reflect heat well and heat passes through the glass and escapes into the outside environment.

SUMMARY OF THE DISCLOSURE

The present disclosure provides an oven having a dielectrically coated glass or glass-ceramic substrate that absorbs electromagnetic radiation preferably having a narrow wavelength distribution, thereby increasing the temperature of the substrate and the dielectric coating composition. The substrate and dielectric coating composition then emit heat radiation preferably having a broad wavelength distribution into the oven cavity. The oven cavity can be rapidly heated to a substantially homogenous temperature. Hot and cold nodes are minimized or eliminated and rotating platforms and additional heat sources are not needed.

Some embodiments of the present disclosure are directed to an oven comprising an enclosed cavity having multiple walls, wherein at least one wall comprises a glass or glass-ceramic substrate; a source of electromagnetic radiation preferably having a narrow wavelength distribution; and a dielectric coating composition applied to the substrate, wherein the dielectric coating composition absorbs the electromagnetic radiation, which increases a temperature of the substrate and the dielectric coating composition. The substrate and dielectric coating composition then emit heat radiation preferably having a broad wavelength distribution into the cavity. The dielectric coating composition in some embodiments comprises a metal oxide, a ceramic oxide, or a combination thereof, wherein the metal oxide is optionally doped with a halogen, a post-transition metal, or a combination thereof.

The present disclosure also provides an oven having a source of electromagnetic radiation and a dielectric coating composition applied to the substrate, wherein the oven comprises an enclosed cavity having multiple walls, wherein at least one wall comprises a glass or glass-ceramic substrate; a first coating layer on at least one side of the substrate; and a second coating layer on top of the first coating layer or on the opposite side of the substrate as the first coating layer. The first coating layer may comprise a source of tin, a source of fluorine, and optionally a source of titanium, optionally a source of silica, or a combination thereof. The second coating layer may comprise a source of tin, a source of fluorine, and optionally a source of cerium, a source of zirconium, or a combination thereof.

The present disclosure also provides a process of preparing an oven having a source of electromagnetic radiation and a dielectric coating composition applied to the substrate, comprising the steps of: heating an uncoated glass or glass-ceramic substrate to a temperature between 1050 and 1200° F.; and applying the coating composition to at least one side of the uncoated substrate.

The ovens of the present disclosure can be used in all residential, commercial, laboratory and industrial applications to increase the temperature of the contents of the oven.

DETAILED DESCRIPTION OF THE DISCLOSURE

Figure 1:
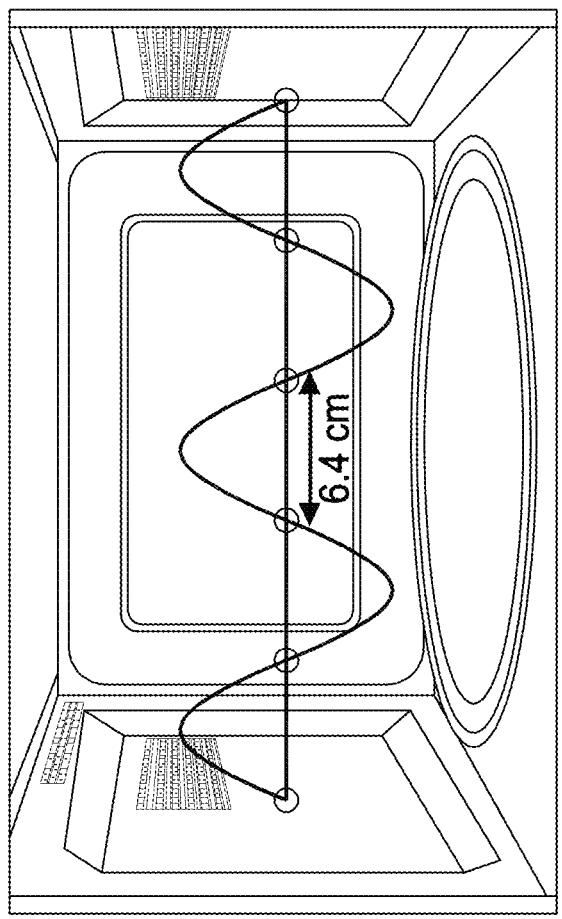
FIG. 1 illustrates a prior art microwave oven having hot and cold nodes.

FIG. 1 illustrates a prior art microwave oven. Even when the walls of the oven are designed to reflect the microwaves, there will still be cold spots or areas within the oven cavity where heating is not as efficient as elsewhere within the cavity. There will be cold spots at the nodes or low points of the microwaves that pass through the cavity. Such ovens will often use components such as a rotating food platform or a wave stirrer to move the contents into the hot nodes or to disperse the microwaves. These components add cost and complexity to the oven and do not necessarily resolve the underlying problem of an inefficiently heated cavity.

Figure 2:
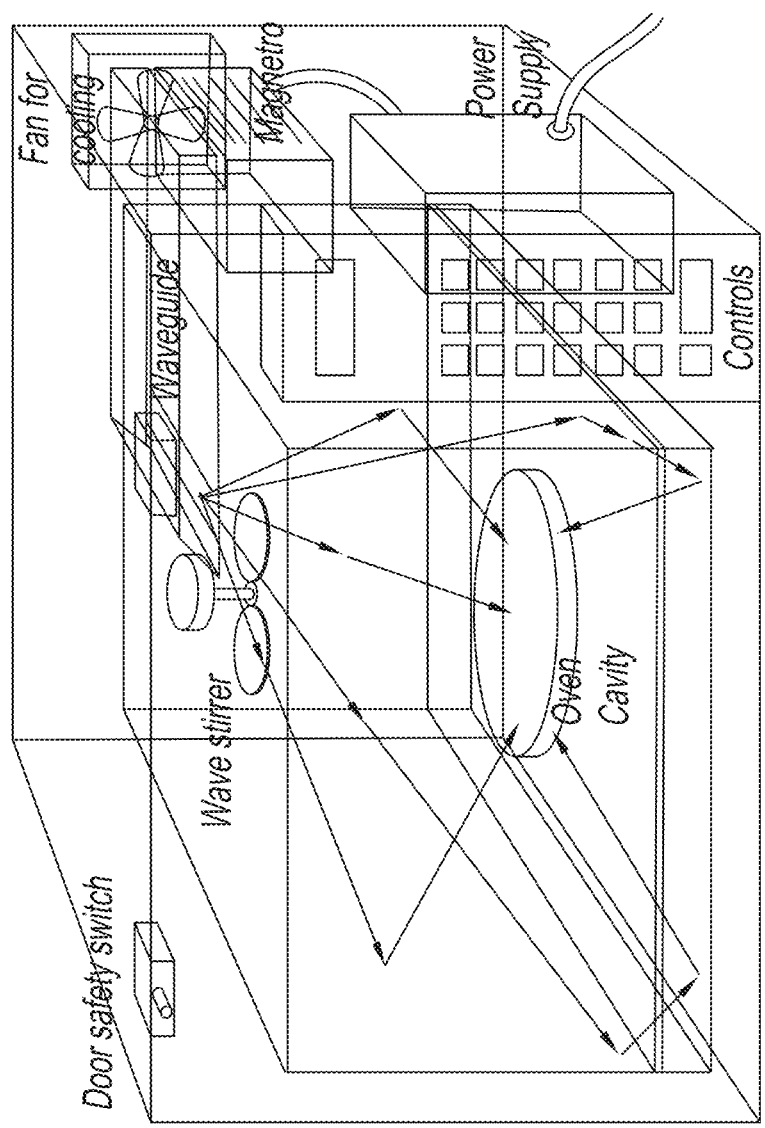
FIG. 2 illustrates the absorption and radiation of heat into the oven cavity in an embodiment of the present disclosure.

The present disclosure provides an oven having a dielectrically coated glass or glass-ceramic substrate. The coated substrate absorbs the electromagnetic radiation, preferably having a narrow wavelength distribution, thereby increasing the temperature of the substrate and the dielectric coating composition, and emits heat radiation, preferably having a broad wavelength distribution, into the oven cavity. The coated substrate, such as a coated oven cavity wall, regardless of its shape, can be almost instantly and uniformly heated. The heated coating composition and heated substrate instantly emit heat into the oven cavity which decreases the time needed to heat the contents within the cavity to a desired temperature. Additional components used in the prior art to move the contents within the oven and to disperse the electromagnetic radiation are not required. FIG. 2 illustrates this absorption and radiation of heat into the oven cavity using a coated substrate of the present disclosure. Although a wave stirrer is shown in FIG. 2, as discussed above, it is not required in the devices of the present disclosure.

The coated substrate of the present disclosure can have one or more coating layers on one or more sides of the substrate. A second coating layer may be advantageous because the first coating layer will not necessarily absorb 100% of the electromagnetic radiation and a certain percentage could possibly transmit through the coated substrate. The additional coating layers will absorb the transmitted electromagnetic radiation that passes through the first coating layer and emit this absorbed radiation as heat into the oven cavity. In this manner, it can be ensured that 100% of the electromagnetic radiation is absorbed and emitted as heat into the oven cavity. In some embodiments, the first coating layer absorbs at least 80%, at least 90% or at least 95% of the electromagnetic radiation, and the second coating layer absorbs the remaining 20%, 10% or 5%. The coating layers of the present disclosure can be applied via pyrolytic deposition, which is not reactive with the atmosphere or chemicals, and is not affected by high temperatures. This overcomes the limitations of sputtered coatings.

The use of the term "glass" in the present disclosure should be understood to include glass and glass-ceramics, including but not limited to soda lime, borosilicate, and lithium aluminosilicate. The term "substrate" signifies a platform to which the coatings described herein can be applied. The substrates of the present disclosure are not limited in shape. The substrates may be flat, curved, concave or convex, and may have rectangular, square or other dimensions.

The coating compositions of the present disclosure, at least the coating layer that touches the substrate, are pyrolytic because they are chemically bonded to the substrate by sharing an oxygen atom and becoming part of the Si—O—X chain. Pyrolytic coatings are "hard" and differ from "soft" coatings like paint that are mechanically adhered to a substrate. Pyrolytic coatings compared to adhered coatings have superior wear resistance, do not easily scratch off, and typically do not require protective topcoats.

At least the coating composition of the present disclosure that touches the substrate is dielectric. Dielectric materials do not increase in temperature by oscillating with frequency. Dielectric materials lag behind the frequency and this force buildup along with some friction generates heat at a much faster rate compared to water molecules for example that oscillate with frequency. The pyrolytic coatings of the present disclosure should lag enough to have this energy buildup, resistance to the force trying to move it. The electromagnetic radiation from the oven can have many different wavelengths, and the composition and properties of the dielectric coating should be selected so that the lag exists. If the dielectric coating oscillates with the frequency at a longer wavelength for example, the dielectric coating would not heat as quickly. If the frequency is too high, the dielectric coating will have less response and less energy buildup, and the dielectric coating might less quickly increase in temperature. In some embodiments of the present disclosure, the electromagnetic radiation is microwave radiation. Microwave radiation should provide rapid heating of the dielectric coating.

Preferably, the electromagnetic radiation has a narrow wavelength distribution and the dielectric coating composition emits heat radiation having a broad wavelength distribution. A wavelength distribution is narrow, if more than 50% of the radiation is within a wavelength interval of $\lambda_0 - 0.05\lambda_0$ to $\Delta_0 + 0.05\lambda_0$, $\lambda_0$ being the wavelength with the highest intensity. 2.45 MHz is the typical frequency of the electromagnetic radiation. The wavelength is typically 12.2 cm which has minimal variation from the source. This is narrow and most electromagnetic radiation generated is narrow. A wavelength distribution is broad, if less than 50% of the radiation is within a wavelength interval of $\lambda_0 - 0.25\lambda_0$ to $\lambda_0 + 0.25\lambda_0$, $\lambda_0$ being the wavelength with the highest intensity. The broad wavelength distribution is for example 1,000 to 15,000 nm or 1,000 to 21,000 nm. There is little influence after 21,000 nm. Peak wavelength is related to temperature but about 90% of the emitted heat radiation is very broad. For instance, a peak at 3,500 nm has a distribution from about 1,000 to 15,000 nm.

The coating compositions of the present disclosure, at least the coating that touches the substrate, are dielectric coatings that have conductivity. The chemical composition, the thickness and other properties of the coating compositions should be selected to couple with the electromagnetic radiation in order to increase the temperature as slowly or as quickly as desired. In addition, the operating parameters of the oven such as the electromagnetic radiation on/off cycle, frequency, wavelength and the electromagnetic radiation wattage output should be considered. Solid state devices with variable power outputs can also be used. The properties of the coated substrate and the oven should be balanced to avoid run away temperatures that could melt the glass and cause thermal shock that could break the glass.

Conductivity is typically measured in ohms/square. In some embodiments of the present disclosure, the conductivity of the coated substrate is from 1 to 100, from 35 to 65, from 1 to 50 or from 51 to 100 ohms/square.

Figure 3:
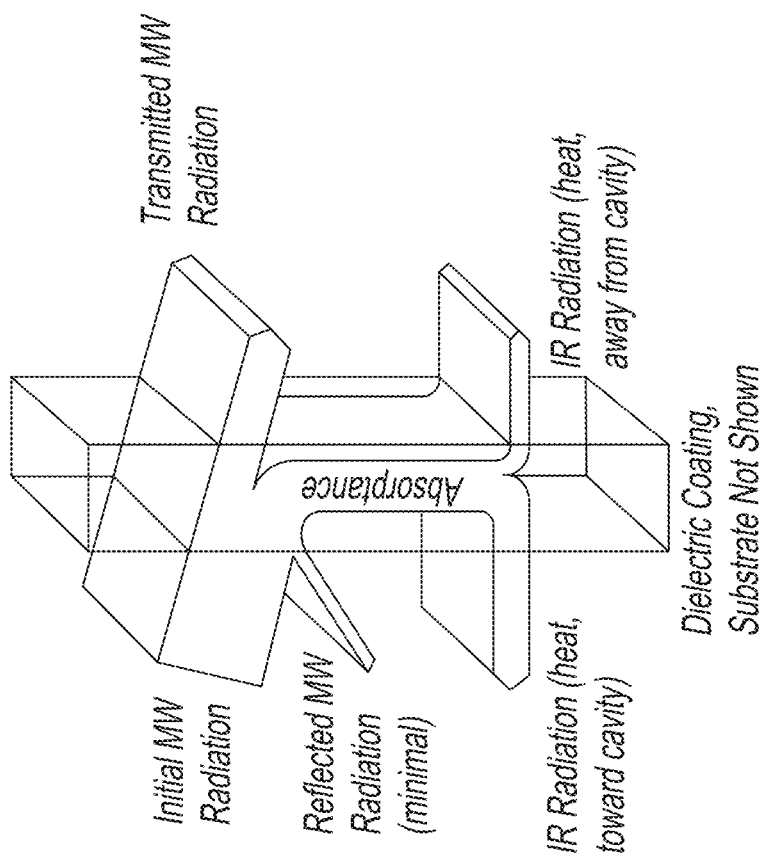
FIG. 3 illustrates the absorption and radiation of heat using a dielectric coating composition in an embodiment of the present disclosure.

FIG. 3 illustrates the conversion of electromagnetic radiation into heat radiation using a dielectric coating composition. When electromagnetic radiation reaches the dielectric coating composition, some of the electromagnetic radiation is reflected back into the cavity and some passes through the dielectric coating composition. The majority of the electromagnetic radiation however is absorbed by the dielectric coating composition and the heat radiation is emitted into the cavity. Additional dielectric coating compositions can be used to convert the electromagnetic radiation that transmits through the first dielectric coating composition.

Figure 4:
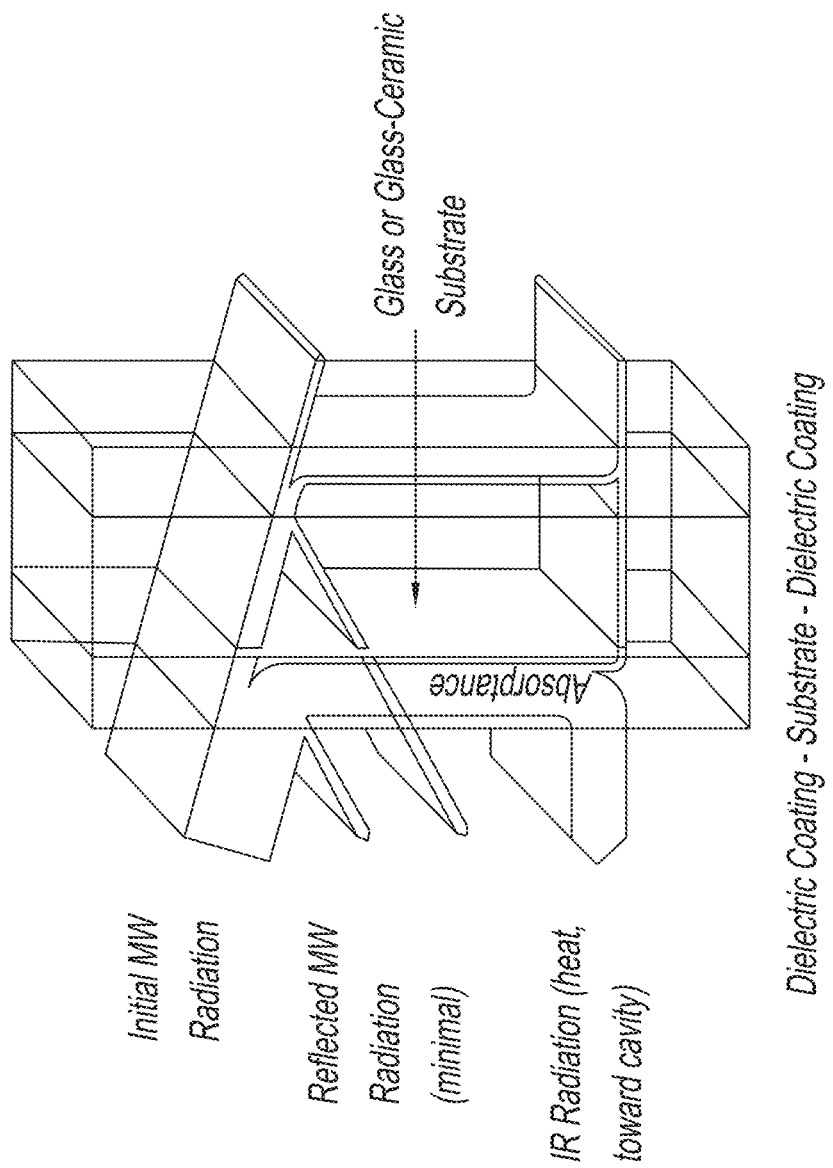
FIG. 4 illustrates an embodiment of the present disclosure where a dielectric coating composition is applied on both sides of the substrate.

FIG. 4 illustrates an embodiment of the present disclosure where a dielectric coating composition is applied on both sides of the substrate. In this embodiment, the second dielectric coating composition interacts with electromagnetic radiation that has passed through the first coating composition, and absorbs the electromagnetic radiation which also increases the temperature of the substrate and the dielectric coating composition, and emits heat radiation into the cavity.

One or more coating composition layers can be applied to each side of the substrate as desired. Similarly, a door or one or more walls of the oven cavity can include a coated substrate. In some embodiments, the coating composition is not on a door. In some embodiments, the substrate is a glass or a glass-ceramic material having a thickness of 1 to 10 mm or 2 to 5 mm. In some embodiments, the thickness of the coating composition is 20 to 400 or 70 to 120 nm for each side of the substrate, or any subranges therebetween. The door and each wall of the oven can have a different substrate and a different coating composition.

Manipulating the number of coating layers, the thickness and composition affects the wavelengths of light that are reflected. The coating layers can be selected to absorb electromagnetic radiation in the range from 1,000 to 5,000 nm for high heat applications, such as baking and self-cleaning, and allow for optimization in the range of 5,000 to 21,000 nm. The overall thickness of the combined coating layers, per side of the glass substrate, should be 500 nm or less, and preferably 350 nm or less, including any subranges thereof. The total combined thickness of the coating layers on both sides of the glass substrate is thus 1,000 nm or less, preferably 700 nm or less, including any subranges thereof. In another embodiment, the combined thickness of coating layers on each side of the glass substrate is 120 nm or less, including any subranges thereof. Individual coating layers can have varying thickness, from 20 to 200 nm, 150 to 200 nm, 50 to 120 nm, or 90 to 120 nm, including any subranges thereof.

Figure 5:
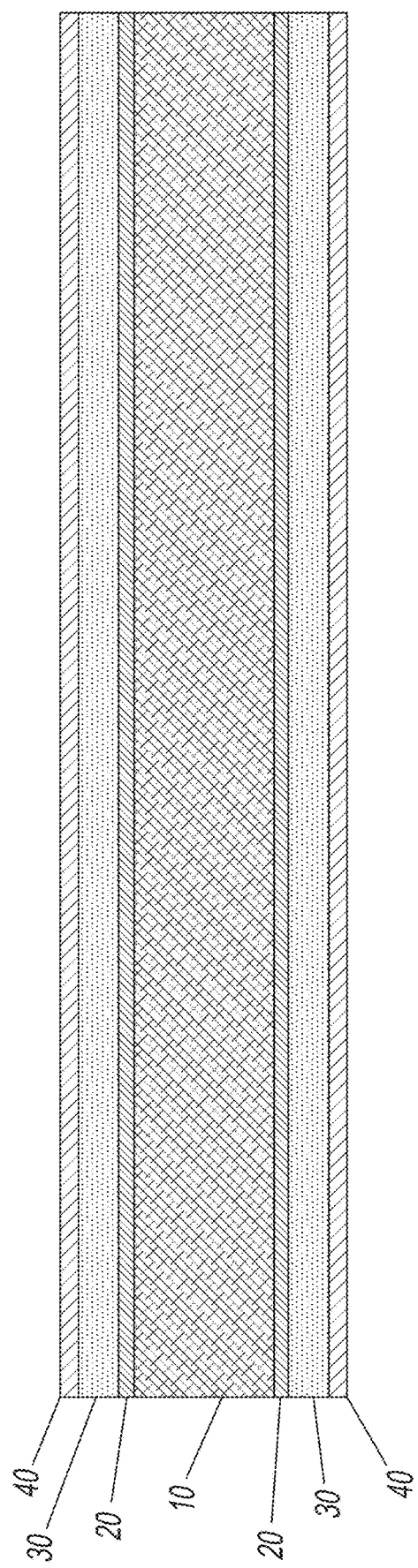
FIG. 5 is a schematic drawing of a layered coating of the present disclosure.

Referring to FIG. 5, a glass substrate 10 is coated with a first coating composition or sub layer 20, an optional second coating composition 30, and an optional third coating composition or top layer 40. Glass substrate 10 can be used in a door or wall for a microwave oven, such as the top, bottom, left, right or rear wall, though the present disclosure is not limited to these applications. Sub layer 20 and optional second and third coating compositions 30,40 can be applied to one or both sides of substrate 10 in the manner described herein. The compositions and properties of all of the layers and the oven are selected so that the coating compositions couple with electromagnetic radiation to heat the coating composition and the substrate which in turn heats the oven cavity.

A first dielectric coating composition can be used for the coating composition or sub layer 20, which may be the only coating layer applied to either side of the substrate. One or more coating compositions which are the same or different may be applied to each side of the substrate, or to just one side of the substrate. The dielectric coating composition in some embodiments comprises without limitation a metal oxide, a ceramic oxide, or a combination thereof. The metal oxides can be selected without limitation from tin (Sn), titanium (Ti, including all oxidation states of titanium), silicon (Si), cerium (Ce), zirconium (Zr), and combinations thereof. Suitable tin oxides can be monobutyl, dibutyl, dioctyl tin oxides, and combinations thereof. Other tin oxides with straight chain carbons may be suitable as well. The ceramic oxides can be selected without limitation from zirconium VI, cerium III, and combinations thereof. In some embodiments, the amount of the metal oxide, ceramic oxide, or combination thereof is 1 to 50 or 10 to 20 weight percent of the coating composition, including any subranges thereof.

The coating compositions may include metal oxides in their pure, undoped form, or doped metal oxides. Suitable dopants include for non-limiting example halogens, post-transition metals, and combinations thereof. The halogen can be selected without limitation from fluorine, chlorine, iodine, and combinations thereof. The post-transition metal can be selected without limitation from tin, indium, germanium, and combinations thereof. The amount of the dopant can be for instance 0.1 to 40 or 5 to 20 weight percent of the coating composition, including any subranges thereof. In a particular embodiment, the coating composition comprises a fluorine-doped tin oxide and an optional source of titanium, an optional source of silica, or a combination thereof.

The halogen can be any compound that is miscible with the metal oxide and the other components in the coating composition. In one embodiment, the halogen is a fluorine compound, such as a carboxylic acid with a fluoride group. One suitable example is trifluoro-acetic acid. The halogen can be present in an amount of 5-30 weight percent of the coating composition, including any subranges thereof.

The coating compositions may optionally include a source of titanium, silica, or a combination thereof, such as in one embodiment, an organic titanium oxide. One suitable example is titanium isopropoxide. These optional sources of titanium and silica can be present in an amount of 2-15 weight percent of the coating composition, including any subranges thereof.

A solvent may be a component of the coating composition. In one embodiment, the solvent is a straight-chain or branched hydrocarbon, such as ethanol. Each of the compounds present in the coating composition should be selected so that there is no phase separation in the coating composition. There should be no solid particulate in the coating composition, nor should the coating composition separate into two or more distinct liquid phases, as would be the case in an emulsion.

The substrate can be made of any glass or glass-ceramic material. Specific examples may include, but are not limited to, soda lime, borosilicate, lithium-alumino-silicate, and combinations thereof. One suitable process for applying the coating composition to the substrate is as follows. The substrate is heated to a temperature of 1050° F. to 1200° F. The coating composition is then sprayed or otherwise applied onto the heated substrate. In this method, the coating composition is formed via pyrolysis. The heat of the glass substrate burns off the volatile components of the coating composition (e.g. the ethanol solvent). Other processes may be used to apply the coating compositions to the substrate, such as chemical vapor deposition.

It is possible to apply one or more coating compositions to the substrate, such as to form sub layer 20, second layer 30 and top layer 40 as illustrated in FIG. 5. The coating compositions may have the same or different compositions and properties. In some embodiments, there are two coating compositions applied to one or more sides of the substrate, and the top coating composition is free of any sources of titanium and silica. This ensures that the top coating composition has a lower index of refraction than the base coating composition.

The metal oxide in the second/top coating composition if present can be the same or similar to that in the first/base coating composition, such as a tin oxide. One suitable example is monobutyl tin trichloride. The source of tin may be present in the second composition in an amount of 15-50 weight percent of the coating composition.

The halogen in the second/top coating composition can be the same or similar to the first/base composition. In one embodiment, the halogen is a source of fluorine such as a carboxylic acid with a fluoride group. The source of fluorine in the second/top coating composition can also be an inorganic fluoride. One suitable example is hydrofluoric acid. The halogen in the second coating composition can be present in an amount of 2-15 weight percent of the coating composition.

As with the first/base coating composition, the solvent for the second/top coating composition can be a straight-chain or branched hydrocarbon, such as ethanol. In one embodiment, the solvent in the second/top coating composition may be water. The solvent in the second/top coating composition can make up the remainder of the second/top coating composition. As with the first/base coating composition, the components of the second/top coating composition should be selected so that they are miscible with one another, do not induce any precipitate, and do not induce any phase separation.

The first/base coating composition may have a higher index of refraction than the second/top coating composition. The ratio of indices of refraction may be such that $n_s/n_t$=1.05 to 1.35, where ns is the index of refraction of the first/base coating composition, and $n_t$ is the index of refraction of the second/top coating composition.

The second/top coating composition may be applied in the same or different manner and under the same or different conditions as the first/base coating composition. As the pyrolysis of first/base coating composition is almost instantaneous, the second/top coating composition can be applied almost immediately after the first/base coating composition. There may also be a brief pause in between application of the two coating compositions, where the substrate is reheated if necessary to the desired temperature range. The compounds in the first and second coating composition may be altered after they are applied to the substrate and undergo pyrolysis. For example, the source of titanium in each of the first and second coating composition may react with ambient oxygen at the elevated temperatures present during application to form titanium dioxide in one or both of the first or second coating composition. However, aside from the solvent, which will evaporate, the first or second coating composition will retain the metal oxide, halogen, and titanium and silica sources, in altered form.

As shown in FIG. 5, the first/base coating composition 20 is applied directly to both sides of substrate 10. However, the present disclosure contemplates that there may be an intermediate layer (not shown in FIG. 5) between substrate 10 and first/base coating composition 20. This intermediate layer may enhance the appearance, strength, or other properties of substrate 10. The intermediate layer may be made of a material such as without limitation tin oxide, silicon dioxide, or titanium dioxide.

Without being bound by theory, it is believed that the source of titanium if present in the first coating composition alters the index of refraction of the first coating composition and provides heat reflecting properties as well. By creating a reflective pyrolytic coating with an adjusted refractive index (via the use of titanium for example), improvements in reflecting light wavelengths from 1000 nm to 3000 nm can be targeted. These infrared reflective surfaces can improve the overall performance and provide an anti-reflective effect for some wavelengths of visible light. The titanium source, pyrolytically deposited in conjunction with the metal oxide, is not reactive with the atmosphere or additional chemicals. It adds to the overall performance of the multi-layer coating on glass and glass ceramic substrates used in heat reflective applications. Existing multi-layer coatings may employ materials with identical indices of refraction, which do not show good results for heat reflection.

The coated substrates of the present disclosure may be used in applications where reflection of wavelengths from 700 to 21,000 nanometers may be advantageous. As previously discussed, one application of this sort would be in residential and commercial ovens or other heating appliances operating in the rage from 245° C. to 500° C. with glass substrates, used as windows or doors. The substrates of the present disclosure may also be used in ovens or heating appliances operating in the range above 500° C., with low expansion glass substrates, used as windows or site glasses.

While the present disclosure has been described with reference to one or more particular embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this disclosure. The ranges disclosed herein include all subranges therebetween.

The invention claimed is:

1. An oven comprising:
an enclosed cavity having multiple walls, wherein at least one wall comprises a glass or glass-ceramic substrate;
a source of electromagnetic radiation; and
a dielectric coating composition applied to the substrate,
wherein the dielectric coating composition is chemically bonded to the substrate, and shares an oxygen atom with the substrate,
wherein the dielectric coating composition absorbs the electromagnetic radiation, thereby increasing a temperature of the substrate and the dielectric coating composition, and
wherein the dielectric coating composition emits heat radiation having a broad wavelength distribution into the cavity.

2. The oven of claim 1, wherein the dielectric coating composition comprises a metal oxide, a ceramic oxide, or a combination thereof.

3. The oven of claim 2, wherein the metal oxide is present, and doped with a halogen, a post-transition metal, or a combination thereof.

4. The oven of claim 2, wherein the metal oxide is present and comprises a tin oxide, a titanium oxide, a silicon oxide, a cerium oxide, a zirconium oxide, or any combinations thereof.

5. The oven of claim 2, wherein the ceramic oxide is present, and comprises zirconium VI, cerium III, or a combination thereof.

6. The oven of claim 2, wherein the metal oxide is present and doped with a halogen, and wherein the halogen comprises fluorine, chlorine, iodine, or any combinations thereof.

7. The oven of claim 3, wherein the post-transition metal comprises tin, indium, germanium, or a combination thereof.

8. The oven of claim 1, wherein the dielectric coating composition consists of a fluorine-doped tin oxide.

9. The oven of claim 1, wherein the dielectric coating composition comprises a first coating layer and a second coating layer, wherein the first coating layer is provided on the glass or glass-ceramic substrate and the second coating layer is provided on the first layer, wherein the first coating layer comprises a fluorine-doped tin oxide and a source of titanium, a source of silica, or a combination thereof, and wherein the second coating layer comprises a fluorine-doped tin oxide.

10. The oven of claim 9, wherein the second coating layer is free of a source of titanium.

11. The oven of claim 1, wherein the electromagnetic radiation is microwave radiation.

12. The oven of claim 1, wherein the oven is a microwave oven.

13. The oven of claim 1, wherein the dielectric coating composition consists of:
   a fluorine-doped tin oxide; and
   a source of titanium, a source of silica, or a combination thereof.

* * * * *